United States Patent
Kilgore

(10) Patent No.: US 7,684,634 B2
(45) Date of Patent: Mar. 23, 2010

(54) SYSTEM AND METHOD FOR ADAPTIVE NON-UNIFORMITY COMPENSATION FOR A FOCAL PLANE ARRAY

(75) Inventor: Patrick M. Kilgore, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 876 days.

(21) Appl. No.: 11/468,137

(22) Filed: Aug. 29, 2006

(65) Prior Publication Data

US 2008/0056606 A1 Mar. 6, 2008

(51) Int. Cl.
*G06K 9/40* (2006.01)
(52) U.S. Cl. .................................... 382/254
(58) Field of Classification Search ............... 382/254
See application file for complete search history.

(56) References Cited

U.S. PATENT DOCUMENTS

| | | | |
|---|---|---|---|
| 5,903,659 A | 5/1999 | Kilgore | |
| 2003/0179418 A1* | 9/2003 | Wengender et al. | ......... 358/437 |
| 2004/0239782 A1 | 12/2004 | Equitz et al. | |

FOREIGN PATENT DOCUMENTS

| EP | 0909428 | 7/2001 |
|---|---|---|
| WO | 0023814 | 4/2000 |
| WO | 0079782 | 12/2000 |
| WO | 0128233 | 4/2001 |

OTHER PUBLICATIONS

Rystrom, Larry, "A study on pixel defect compensation for staring focal plane arrays", Proceedings of SPIE, Bellingham, VA., (1989), vol. 1157, pp. 250-266.
International Search Report and Written Opinion from corresponding International Application No. PCT/US07/70714.

* cited by examiner

*Primary Examiner*—Bhavesh M Mehta
*Assistant Examiner*—Hadi Akhavannik
(74) *Attorney, Agent, or Firm*—Renner, Otto, Boisselle & Sklar LLP

(57) ABSTRACT

A method of reducing an amount of fixed pattern noise from an image signal generated by an image sensor. The method includes, for each operational pixel in the image signal, applying a recursively updated offset term to generate a corrected image signal. The offset correction terms are recursively updated by spatially filtering the corrected image signal for a current frame of the image signal; comparing the filtered corrected image signal of the current frame with a spatially filtered corrected image signal of a preceding frame of the image signal; and updating the offset correction terms with terms generated as a function of the comparison.

23 Claims, 5 Drawing Sheets

FIG. 5A

| H | L | H | L | H | L | H | L | H | L |
|---|---|---|---|---|---|---|---|---|---|
| L | $I_{1,1}$ | $I_{1,2}$ | $I_{1,3}$ | $I_{1,4}$ | $I_{1,5}$ | $I_{1,6}$ | $I_{1,7}$ | $I_{1,8}$ | H |
| H | $I_{2,1}$ | $I_{2,2}$ | $I_{2,3}$ | $I_{2,4}$ | $I_{2,5}$ | $I_{2,6}$ | $I_{2,7}$ | $I_{2,8}$ | L |
| L | $I_{3,1}$ | $I_{3,2}$ | $I_{3,3}$ | $I_{3,4}$ | $I_{3,5}$ | $I_{3,6}$ | $I_{3,7}$ | $I_{3,8}$ | H |
| H | $I_{4,1}$ | $I_{4,2}$ | $I_{4,3}$ | $I_{4,4}$ | $I_{4,5}$ | $I_{4,6}$ | $I_{4,7}$ | $I_{4,8}$ | L |
| L | $I_{5,1}$ | $I_{5,2}$ | $I_{5,3}$ | $I_{5,4}$ | $I_{5,5}$ | $I_{5,6}$ | $I_{5,7}$ | $I_{5,8}$ | H |
| H | $I_{6,1}$ | $I_{6,2}$ | $I_{6,3}$ | $I_{6,4}$ | $I_{6,5}$ | $I_{6,6}$ | $I_{6,7}$ | $I_{6,8}$ | L |
| L | $I_{7,1}$ | $I_{7,2}$ | $I_{7,3}$ | $I_{7,4}$ | $I_{7,5}$ | $I_{7,6}$ | $I_{7,7}$ | $I_{7,8}$ | H |
| H | $I_{8,1}$ | $I_{8,2}$ | $I_{8,3}$ | $I_{8,4}$ | $I_{8,5}$ | $I_{8,6}$ | $I_{8,7}$ | $I_{8,8}$ | L |
| L | H | L | H | L | H | L | H | L | H |

FIG. 5B

| L | H | L | H | L | H | L | H | L | H |
|---|---|---|---|---|---|---|---|---|---|
| H | $I_{1,1}$ | $I_{1,2}$ | $I_{1,3}$ | $I_{1,4}$ | $I_{1,5}$ | $I_{1,6}$ | $I_{1,7}$ | $I_{1,8}$ | L |
| L | $I_{2,1}$ | $I_{2,2}$ | $I_{2,3}$ | $I_{2,4}$ | $I_{2,5}$ | $I_{2,6}$ | $I_{2,7}$ | $I_{2,8}$ | H |
| H | $I_{3,1}$ | $I_{3,2}$ | $I_{3,3}$ | $I_{3,4}$ | $I_{3,5}$ | $I_{3,6}$ | $I_{3,7}$ | $I_{3,8}$ | L |
| L | $I_{4,1}$ | $I_{4,2}$ | $I_{4,3}$ | $I_{4,4}$ | $I_{4,5}$ | $I_{4,6}$ | $I_{4,7}$ | $I_{4,8}$ | H |
| H | $I_{5,1}$ | $I_{5,2}$ | $I_{5,3}$ | $I_{5,4}$ | $I_{5,5}$ | $I_{5,6}$ | $I_{5,7}$ | $I_{5,8}$ | L |
| L | $I_{6,1}$ | $I_{6,2}$ | $I_{6,3}$ | $I_{6,4}$ | $I_{6,5}$ | $I_{6,6}$ | $I_{6,7}$ | $I_{6,8}$ | H |
| H | $I_{7,1}$ | $I_{7,2}$ | $I_{7,3}$ | $I_{7,4}$ | $I_{7,5}$ | $I_{7,6}$ | $I_{7,7}$ | $I_{7,8}$ | L |
| L | $I_{8,1}$ | $I_{8,2}$ | $I_{8,3}$ | $I_{8,4}$ | $I_{8,5}$ | $I_{8,6}$ | $I_{8,7}$ | $I_{8,8}$ | H |
| H | L | H | L | H | L | H | L | H | L |

SYSTEM AND METHOD FOR ADAPTIVE NON-UNIFORMITY COMPENSATION FOR A FOCAL PLANE ARRAY

This invention was made with Government support under Contract No. W31P4Q-04-C-0059. The Government has certain rights in this invention.

TECHNICAL FIELD

The present invention relates to image sensing and, more particularly, to adaptive non-uniformity compensation for a focal plane array to reduce fixed pattern noise present in sensor images.

BACKGROUND

Focal plane arrays (FPAs) are used in various applications to capture images for subsequent processing. For example, non-line of sight launch system (NLOS-LS) precision attack missiles (PAMs) have employed uncooled infrared (UCIR) sensors with a focal plane array to capture infrared images for use in target tracking. The focal plane array has a matrix of infrared detector elements arranged in a matrix of rows and columns yielding an n row by m column focal plane array. An exemplary UCIR sensor may have a focal plane array of 640×480 detectors. The output of each detector may be referred to as a pixel.

Each detector may have a slightly different sensitivity to infrared radiation than other detectors. For example, the output of some pixels may be too bright or too dark for a given amount of incident radiation. This non-uniform sensitivity yields fixed pattern noise (FPN). Fixed pattern noise may manifest itself in the output image of the sensor by resulting in a non-uniform response across the image. Thus, fixed pattern noise leads to degradation in target recognition, acquisition and tracking.

Some attempts to compensate for fixed pattern noise have been made using a rudimentary approach to non-uniformity compensation (NUC). This approach uses a simplistic algorithm that adjusts each pixel with an offset value. The offset values are generated by determining an amount of change needed to place each pixel at a mid-gray level in response to a given input. In practice, the offset values are calculated in response to a uniform input image on the focal plane array (e.g., a "bland" and "smeared" image generated by de-focusing imaging optics). Once the offset values are generated, the system images in a normal manner while applying the offset values to the outputs of each pixel. While simple, this approach causes unneeded biases in overall image level and potentially creates artifacts (e.g., an after-image burn-in of the input scene that was used during the creation of the offset values). Also, this technique does not address pixels that are defective.

SUMMARY OF THE INVENTION

In view of the above-mentioned issues relating to fixed pattern noise and insufficient correction techniques for fixed pattern noise, there is a need in the art for a system and method for adaptive non-uniformity compensation for a focal plane array to improve sensor images.

According to one aspect of the invention, a method of reducing an amount of fixed pattern noise from an image signal generated by an image sensor includes, for each operational pixel in the image signal, applying a recursively updated offset term to generate a corrected image signal; and recursively updating the offset correction terms. The recursive updating includes spatially filtering the corrected image signal for a current frame of the image signal; comparing the filtered corrected image signal of the current frame with a spatially filtered corrected image signal of a preceding frame of the image signal; and updating the offset correction terms with terms generated as a function of the comparison.

According to one embodiment of the method, the spatial filtering includes applying an anti-means filter to pixels of the frame of the image signal.

According to one embodiment of the method, the spatial filtering includes applying a median filter to pixels of the frame of the image signal and the anti-means filter is applied to the output of the median filter.

According to one embodiment of the method, the median filter has an arrangement of pixel elements centered on a pixel to be filtered, the median filter selects the value of the middle pixel element in terms of magnitude as an output of the median filter for the pixel to be filtered.

According to one embodiment of the method, a value for a defective pixel in the pixel elements of the filter is replaced with a replacement value prior to selection of the output of the median filter.

According to one embodiment of the method, the replacement value is a maximum possible pixel value or a minimum possible pixel value.

According to one embodiment of the method, the anti-means filter has an arrangement of pixel elements centered on a pixel to be filtered, the anti-means filter averages values of the pixel elements to generate an output of the spatial filtering.

According to one embodiment of the method, the anti-means filter averages pixels neighboring the pixel to be filtered to generate the output of the spatial filtering.

According to one embodiment, the method further includes moving the image sensor so that the current frame and the preceding frame have different perspectives of a scene imaged by the image sensor.

According to one embodiment, the method further includes identifying defective pixels in the corrected image signal and replacing a value for each defective pixel.

According to one embodiment of the method, the replacement value for each defective pixel is generated by applying a median filter to the defective pixel.

According to one embodiment of the method, the median filter has an arrangement of pixel elements centered on the defective pixel, the median filter selects the value of the middle pixel element in terms of magnitude as the replacement value for the defective pixel.

According to one embodiment of the method, during median filtering a value for each defective pixel in the pixel elements of the filter is replaced with a replacement value selected from a maximum possible pixel value or a minimum possible pixel value.

According to one embodiment of the method, the defective pixels are selected from factory dead pixels, drifters, blinkers, and combinations thereof.

According to one embodiment of the method, generation of the offset correction terms as a function of the comparison includes generating an error value for each pixel, the error value being the smaller of the relative magnitudes of the spatially filtered pixel value for the current frame and the spatially filtered pixel value for the preceding frame; modifying the error value by generating a fraction of the error value, the fractional size based on the magnitude of the error value; and applying a term decay to the modified error values.

According to one embodiment, the method further includes freezing the recursive updating of the offset correction terms an end of an initiation period and correcting the image signal with the frozen correction terms after the initiation period.

According to one embodiment of the method, the offset correction term is not updated for a pixel if a difference between the current spatial filter value for the pixel and the preceding filter spatial filter value for the pixel is greater than a predetermined threshold.

According to one embodiment, the method further includes outputting the corrected image signal to a target tracking system of a missile.

According to another aspect of the invention, an imaging system includes a focal plane array that generates an image signal; and a video processing assembly that reduces an amount of fixed pattern noise from the image signal by applying a recursively updated offset term to each operational pixel in the image signal to generate a corrected image signal. The video processing assembly recursively updates the offset correction terms by spatially filtering the corrected image signal for a current frame of the image signal; comparing the filtered corrected image signal of the current frame with a spatially filtered corrected image signal of a preceding frame of the image signal; and updating the offset correction terms with terms generated as a function of the comparison.

According to one embodiment, the imaging system further includes a gimbal to move the focal plane array so that the current frame and the preceding frame have different perspectives of a scene imaged by the focal plane array during updating of the offset correction terms.

According to one embodiment of the imaging system, the video processing assembly identifies defective pixels in the corrected image signal and replaces a value for each defective pixel.

According to one embodiment of the imaging system, the spatial filtering includes applying a median filter to pixels of the frame of the corrected image signal and applying an anti-means filter to the output of the median filter.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIGS. 5A and 4B are representations of an exemplary image with added border rows and columns used during median value calculation;

DESCRIPTION

A. System Overview

Figure 1:
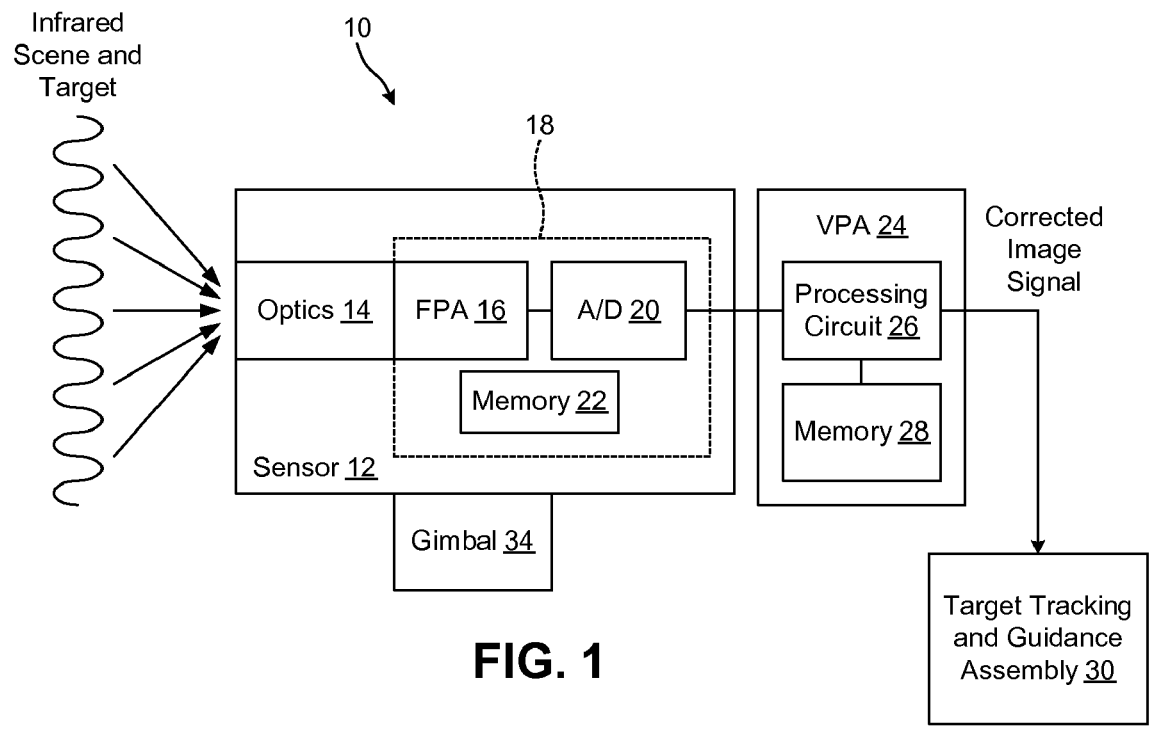
FIG. 1 is a simplified schematic diagram of a tracking system that includes an image sensor and a video processing assembly that conducts adaptive non-uniformity compensation on an image signal in accordance with aspects of the present invention.

Embodiments of the present invention will now be described with reference to the drawings, wherein like reference numerals are used to refer to like elements throughout. It will be understood that the figures are not necessarily to scale.

In this document, the invention is described primarily in the context of a sensor system for a missile. It will be appreciated that the invention is not intended to be limited to a missile and the sensor system can be used in any environment where an improvement in the output of a focal plane array is desired.

FIG. 1 is a simplified schematic diagram of a missile tracking system 10. In general, the tracking system 10 includes a sensor 12 that produces an image signal corresponding to an infrared scene. The sensor 12 may include optics 14 that collects incident infrared energy from the scene and focuses the radiation onto a focal plane array (FPA) 16. The focal plane array 16 produces an infrared image of the scene being tracked. The sensor 12 may be, for example, an uncooled infrared (UCIR) focal plane array that forms part of a camera core 18 of the sensor 12. The focal plane array 16 may have an arrangement of detector elements. The detector elements may be arranged in a matrix of rows and columns, yielding an n row by m column focal plane array. In one embodiment, the focal plane array 16 may have an array of 640×480 detectors.

The camera core 18 also may include an analog-to-digital (A/D) converter 20 that converts an analog output of each detector element into a digital value. Each detector, therefore, produces a pixel in a composite infrared image. Each pixel has a value indicative of brightness or intensity of the incident radiation. The aggregation of the pixels is an image signal having image data that corresponds to the scene. The image may be updated at a desired frame rate to generate an infrared video of the scene.

The camera core 18 may include a non-volatile memory 22 for storing information about the focal plane array 16. For instance, the identification of "factory dead" pixels (described below in greater detail) may be stored by the memory 22.

The image signal output by the camera core 18 is passed to a video processing assembly (VPA) 24. The video processing assembly 24 may, according to aspects of the invention, processing the image signal using an adaptive non-uniformity compensation (ADNUC) technique to generate and output a corrected image signal in which fixed pattern noise (FPN) introduced by non-uniform response characteristics of the detector elements of the focal plane array 16 have been reduced. The video processing assembly 24 may include a processing circuit 26 for carrying out the adaptive non-uniformity compensation functions. The processing circuit 26 may include any appropriate circuit assembly, such as a general purpose processor for executing logical instructions, an application specific integrated circuit (ASIC), a programmable logic array or an arrangement of dedicated circuit components. In a preferred embodiment, the adaptive non-uniformity compensation functions are embodied as firmware whose operations are carried out by the processing circuit 26. The video processing assembly 24 may include a memory 28, such as a buffer or flash memory, for storing data as part of the adaptive non-uniformity compensation functionality.

Figure 2:
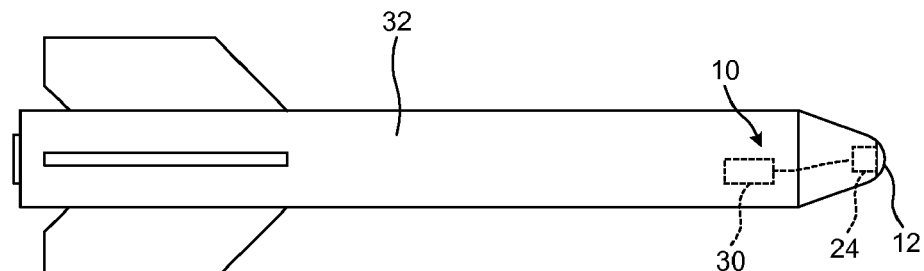
FIG. 2 is a representation of a missile that includes the tracking system of FIG. 1.

With additional reference to FIG. 2, a missile 32 in which the tracking system 10 may be incorporated is shown. The missile 32, which could be a non-line of sight launch system (NLOS-LS) precision attack missile (PAM) or any other type of missile, is illustrated as an exemplary environment in which aspects of the invention have application.

The adaptive non-uniformity compensation functions may adjust each pixel to compensate for the differing sensitivity of each detector in the focal plane array 16. The resulting corrected image signal may be passed to a target tracking and guidance assembly 30 that employs the corrected output image signal for purposes of target recognition, acquisition and tracking, upon which missile 32 guidance may be made.

B. ADNUC High Level Description

The adaptive non-uniformity compensation (ADNUC) applied to the image signal by the video processing assembly 24 adjusts each pixel to compensate for fixed pattern noise by adding a unique, scene-based offset correction to each pixel. The adjustment to each pixel may be made by applying a dynamically updated offset correction term that corresponds to the pixel in question. In addition, the video processing assembly 24 may dynamically declares pixels that cannot be corrected for response as "defective" and replaces defective pixels with an estimated value based on the surrounding pixels. The output of the video processing assembly is a corrected image signal that may be used by the target tracking and guidance assembly 30. For instance, the corrected image signal may be processed by an autonomous target acquisition (ATA) algorithm and a tracker algorithm.

Figure 3:
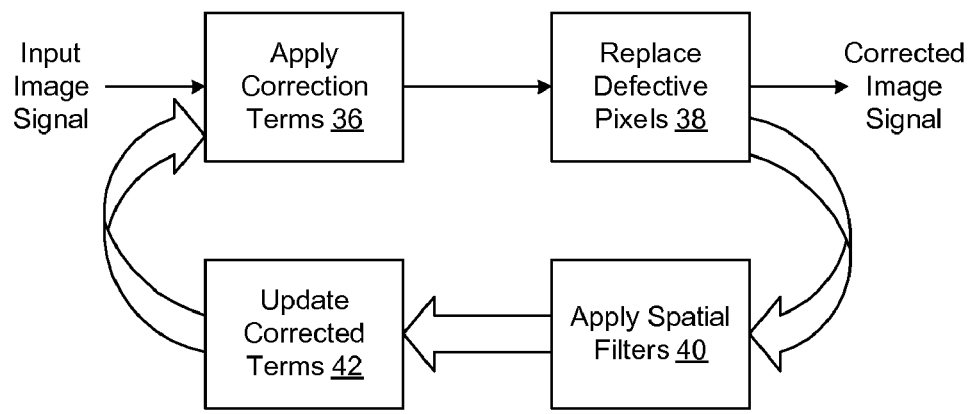
FIG. 3 is a high level functional flow diagram of the operation of the adaptive non-uniformity compensation.

With additional reference to FIG. 3, shown is a high level functional flow diagram of the operation of the adaptive non-uniformity compensation carried out by the video processing assembly 24. The flow diagram of FIG. 3 may be thought of as depicting steps in a method. The method may include establishing and updating the adaptive non-uniformity compensation offset correction terms using a recursive filtering technique, and applying those correction terms to the pixels of the image signal to generate the corrected output signal. The process aims to avoid the production of artifacts in the corrected output signal while removing fixed pattern noise.

To reduce the occurrence of fixed pattern noise in the corrected image signal with a minimum amount of artifacts, the method uses two sequential image frames at a time to differentiate between fixed pattern noise and scene input. It is desirable that the scene registration on the focal plane array is different for the two image frames under consideration. The differences in scene registration may be accomplished by controlling the orientation of the sensor 12 during adaptive non-uniformity compensation processing (e.g., during the establishing and updating of the offset correction terms). In one embodiment, the sensor 12 is mounted on a gimbal 34 (FIG. 1) that controls the position of the sensor 12. The gimbal 34, and associated control members and controller (not shown), controls gimbal motion of the sensor 12 to slightly change the perception of the scene by the sensor 12 from frame to frame. The gimbal 34 also may fix the orientation of the sensor 12 for other imaging tasks of the tracking system 10.

Referring to the blocks of FIG. 3, in block 36, for each pixel, a current correction term corresponding to the pixel is applied. Then, in block 38, defective pixels are replaced. At this point, compensation has been applied to each pixel of the image and the image frame may be output to the target tracking and guidance assembly 30 for processing such as autonomous target acquisition and/or open/closed loop tracking. In addition, the output image is processed to complete a recursive cycle of updating the correction terms for the next image. The updating of the correction terms involve applying spatial filters to the image and comparing the filtered image to the previously filtered image to update the correction terms for the next image. In this manner, fixed pattern noise may be recursively reduced or completely removed.

As will be described in greater detail in the following description, the defective pixels may include factory dead pixels and dynamically dead pixels. The identities of the defective pixels may be stored in a database, referred to as a pixel map. Factory dead pixels may be identified by the manufacturer of the focal plane array and the identity of the factory dead pixels may be stored in the memory 16 of the camera core 18. In one embodiment, the factory dead pixels are tagged with a value of zero in the image signal output by the camera core 18. Dynamically dead pixels may include drifters and blinkers, which will be described in greater detail below. The dynamically dead pixels may be detected by the video processing assembly 24. Pixel values for the defective pixels may be replaced in block 38.

The replacement of the defective pixels may occur as a precursor to the application of spatial filters in block 40. In block 40, the image (as corrected in block 36) is run through a series of filters. The filters may include a three pixel by three pixel ("3×3") median filter to remove noise from the image. The median filter may be used to perform the function of replacing the defective pixels. Thus, the first filter of block 40 and the replacement of defective pixels of block 38 may be combined. Next, a 3×3 anti-mean filter may be applied to compute a difference between the average values of the pixels surrounding the pixel that is being processed and the value of the pixel that is being processed.

Thereafter, in block 42, the filtered image output by block 40 may be compared to the filtered image from the previous frame in order to update the correction terms for the next image. In particular, the comparison function is performed on anti-mean values for the current image versus anti-mean values from the previous image. The output of the comparison is applied in block 36 as the correction terms for the next image.

C. ADNUC Detailed Operation

This section describes an exemplary manner in which adaptive non-uniformity compensation in accordance with aspects of the invention may be carried out. Modifications to this manner of implementation that fall within the scope of the invention as set forth in the claims appended hereto will be apparent to one of ordinary skill in the art.

In one embodiment, the image processing may be performed by the firmware resident in the video processing assembly 24 on 16-bit pixel data. The output of the A/D 20 of the camera core 18 may be a 14-bit output. The 14-bit data is input to the video processing assembly 24 and bit shifted to the left by two (multiplied by a decimal value of 4). The two least significant bits of the resulting 16-bit word is set to binary 10. Bit shifting allows for data processing operations, including calculations and filtering, to be conducted with higher bit precision than would be achieved with 14-bit data. Setting the two least significant bits to binary 10 allows for rounding to take place. Rounding may be carried out since, in one embodiment, the processing circuit 26 may truncate value in various calculations. The corrected image signal output by the video processing assembly 24 may contain 16-bit pixel data.

Calculations may be made using fixed point math. Thus, the processing may be integer based where no floating point calculations are made. The processing may be implemented to work in a pipeline fashion. Pipeline processing may allow for reduced video buffering. For example, in one embodiment only three lines of image data are buffered at any given time. Left shift and right shift operations are used to replace integer multiply and divide operations for throughput efficiency.

Figure 4:
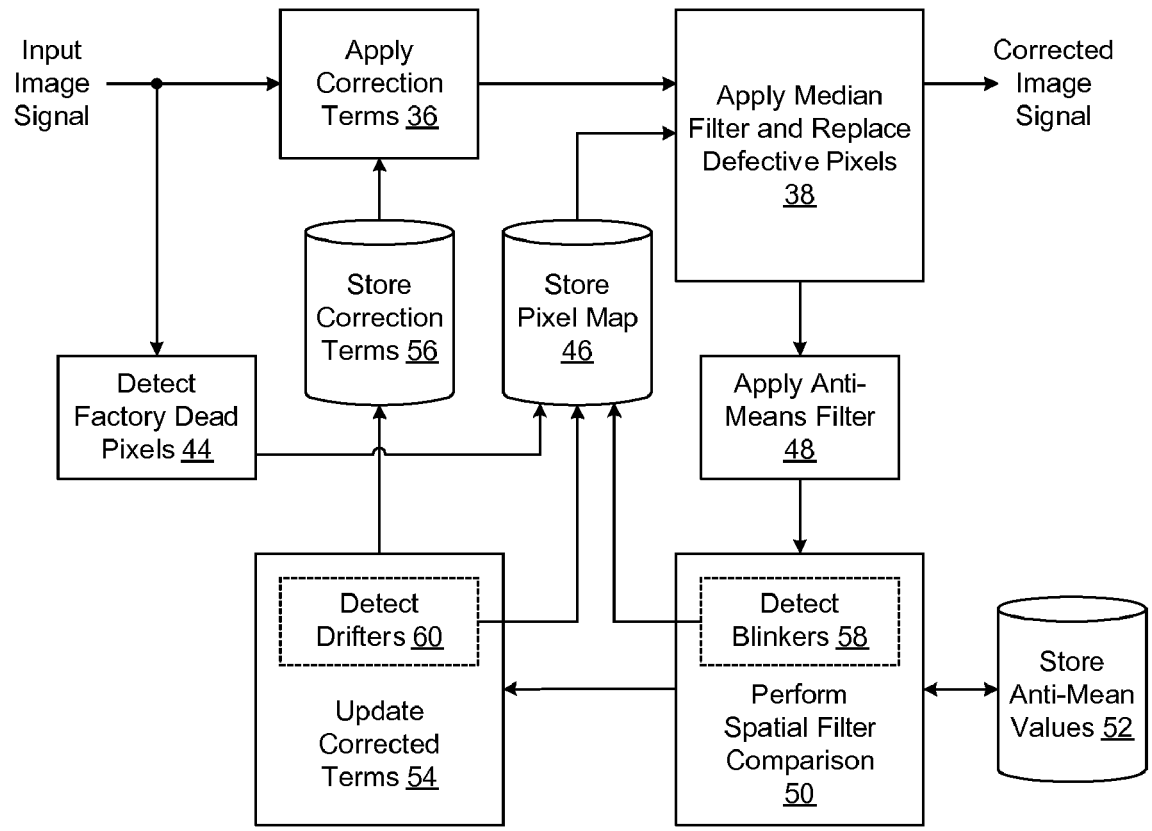
FIG. 4 is a detailed functional flow diagram of the operation of the adaptive non-uniformity compensation.

With additional reference to FIG. 4, shown is an exemplary functional flow diagram of logical operations performed by the video processing assembly 24 to carry out adaptive non-uniformity compensation on an image signal. FIG. 4 may be thought of as depicting steps of a method. Although the description relating to FIG. 4 describes a specific order of executing functional logic blocks, the order of execution of the blocks may be changed relative to the order shown and/or described. Also, two or more blocks shown in succession may be executed concurrently or with partial concurrence. Certain blocks may be omitted. In addition, any number of commands, state variables, semaphores or messages may be added to the logical flow for purposes of enhanced utility, accounting, performance, measurement, troubleshooting, and the like. It is understood that all such variations are within the scope of the present invention. The logical blocks of FIG. 4 also may be thought of as structural blocks. For instance, the application of a filter may correspond to the filter itself and the detections of dead pixels may correspond to a detector.

C(i). Detection of Factory Dead Pixels

The adaptive non-uniformity compensation may start in block 44 by detecting factory dead pixels from the current image frame. This detecting may be carried out before any compensations are made to the image in block 36.

In one embodiment, all pixels in the image are present in a pixel map that is used to store information about the pixels using tags. Non-defective pixels are identified through the setting of tags as having no defect, and factory dead and dynamically dead pixels are identified in the pixel map with corresponding tags. The tagging of factory dead pixels, as well as dynamically dead pixels, is described below in greater detail. In one implementation of this embodiment, each pixel has four tags that may be set to yes or no. Each tag may be represented by a one bit digital word. Table 1 defines the meaning of each tag.

TABLE 1

| Tag # | Content | Explanation |
|---|---|---|
| 1 | Update correction term (Y/N) | Pixel is operating within specification and the corresponding correction term should or should not be updated |
| 2 | Factory dead (Y/N) | Pixel is inoperative as determined by focal plane array manufacturer and has a pixel value of zero in the image signal |
| 3 | Drifter (Y/N) | Pixel is a drifter since corresponding correction term is outside predetermined bounds |
| 4 | Blinker (Y/N) | Pixel is a blinker since it has a pixel value that is unexpectedly large or small compared to its neighbors. |

C(ii). Application of Correction Terms

Following block 44, the logical flow may proceed to block 36 where the current set of correction terms are applied to the input image. The current set of correction terms may be stored by the memory 28 in a data structure that stores a correction term for each pixel in the image. The correction terms are offset values so that each correction term may be added to the corresponding pixel value to provide non-uniformity correction to the image.

In one embodiment, each correction term has eight times the precision of the corresponding pixel and has a 20-bit signed value stored as a 16-bit signed value. In this implementation, the amount of correction, or range, is sacrificed in order to provide higher precision.

The application of the offset correction terms is accomplished by taking a given pixel value, which is a 16-bit unsigned value, and placing the pixel value into a 20-bit register that is most significant bit (MSB) justified. The lower 4-bits of the 20-bit pixel value are filled with zeros if the corresponding offset correction term is positive. The lower 4-bits of the 20-bit pixel value are filled with ones if the corresponding offset correction term is negative. The use of zeros or ones in this manner to fill the four least significant bits allows for truncation so that negative values may computationally behave in the same manner as of positive values.

The offset correction term (which is a 16-bit signed value) corresponding to the pixel value being processed also is placed into a 20-bit register that is most significant bit justified. The lower 4-bits are filled with zeros. Then, the 20-bit offset correction term is divided by 1, 2, 4, 8, or 16 by shifting value to the right by 0, 1, 2, 3, or 4 places, respectively.

The 20-bit pixel value is then summed with the shifted 20-bit offset correction term, resulting in a 20-bit unsigned value. A corrected pixel value is generated by capturing the upper 16-bits (most significant bits) of the summed value to yield a 16-bit unsigned corrected pixel value.

C(iii). Replacement of Defective Pixels and Median Filtering

The logical flow may proceed to block 38 where median values for each pixel are generated and defective pixels are replaced. In particular, pixel values for pixels identified in the pixel map as factory dead, blinkers and drifters may be generated as part of a median filter process.

The median filter operation of block 38 may apply a 3×3 filter to the image for each pixel. A 3×3 filter has nine elements, including the pixel undergoing filtering and eight immediately adjacent pixels surrounding the pixel undergoing filtering. The eight neighboring pixels are those immediately above, below, to the left of, to the right of, to the upper-right of, to the upper-left of, to the lower-right of and to the lower-left of the pixel undergoing filtering. To address pixels in the perimeter rows and columns of the image that do not have a full compliment of neighboring pixels during calculation of the medians, a border of pixels may be added to the image.

With additional reference to FIGS. 5A and 5B, illustrated is an exemplary 8×8 image. Corrected image values output from block 36 for each pixel are represented by an upper case "I" followed with a pair of subscript numbers referring respectfully to the row and column of the pixel. A border of pixels has been added around the image. The added pixels have a high value (denoted by an upper case "H" and corresponds to a maximum pixel value) or a low value (denoted by an upper case "L" and corresponds to a minimum pixel value). For purposes of median calculation the added border pixels alternate in value between high and low in a "checkerboard" arrangement. The checkerboard of high and low values are alternated (e.g., inversed) from one frame to the next to minimize edge effects that may be otherwise introduced by the median filter. Thus, the arrangement of high and low values for alternative frames are respectively shown in FIG. 5A and FIG. 5B. For instance, the values shown in FIG. 5A may be used for even frames and the values shown in FIG. 5B may be used for odd frames.

If any pixels in the image are defective, the defective pixels are replaced using a median calculation process. The replacement values for the defective pixels are placed in the video stream output in block 38 as part of the corrected image signal. Then, using the corrected image signal with replaced defective pixels, medians for all pixels are calculated and output for further spatial filtering.

This process allows the median filter to feedback on its own output and replace clusters of defective pixels. The feedback occurs on the previously processed row. It may be preferable to replace defective pixels immediately with the median value as soon as the median is calculated. However, in implementation, one may be limited by gating within the video processing assembly 24 that is driven by sequential clock cycles. Thus, replacement may be implemented by replacing the defective pixels of previous row one cycle after the replacement values have been calculated.

To calculate a median value, corrected pixel values for the nine filter elements are sorted in order of magnitude. The middle value of the sorted list is the median. When determining a replacement value, dead pixels are replaced with a checkerboard of high values and low values across the image just prior to making median calculations to determine the replacement values. In this way, defective pixels have less influence on the median calculation because the high value or low value for the defective pixel will be placed at a corresponding end of the sorted list of pixel element values. The checkerboard may be considered a replacement map that indicates which value (high or low) to use based on the relative location of the defective pixel in the image.

An exemplary process of defect pixel replacement is illustrated in FIGS. 6A to 6D. FIGS. 6A to 6D show an exemplary 5×5 section of an image frame. It will be appreciated that the processing performed in the exemplary 5×5 section may be performed across the on the entire image. Any median calculations and pixel replacements carried out on a pixel in an edge row or column may include using the high values and low values of the added border shown in FIGS. 5A and 5B.

Figure 6A:
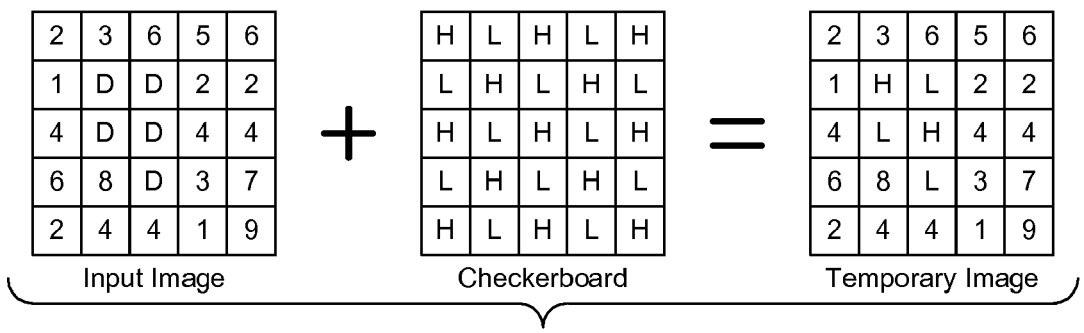
FIGS. 6A to 6D are representations of a section of an image in various stages of defective pixel replacement.

Starting with FIG. 6A, the input to block 38 (labeled "input image" and corresponds to the output of block 36) is combined with the defective pixel replacement map (labeled "checkerboard") to generate a "temporary image." In particular, defective pixels (labeled using an upper case "D") are replaced with the value from the checkerboard that has a positional correspondence to the defective pixel. Non-defective pixels are shown having a numeric value of one through nine for purposes of a simplified example.

Figure 6B:
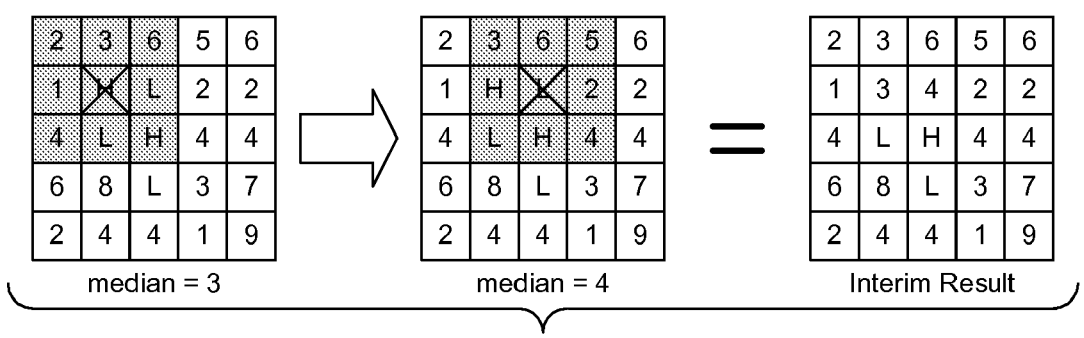

Proceeding to FIG. 6B, defective pixels are replaced in the example in row by row fashion. The first defective pixel appears in the second row. Thus, a median filter is applied to the first defective pixel in the second row using the values in the temporary image. This pixel is identified with crossmarks drawn through the pixel and the nine member elements for the median calculation are shown with a shaded background. The exemplary elements may be placed in order (e.g., sorted). For the example, the order may be H, H, 6, 4, 3, 2, 1, L and L. The middle value, or the median, for this order is the value 3. Thus, in the interim result, a 3 is used to replace the first defective pixel. The same process may be used for any remaining defective pixels in the second row.

Figure 6C:
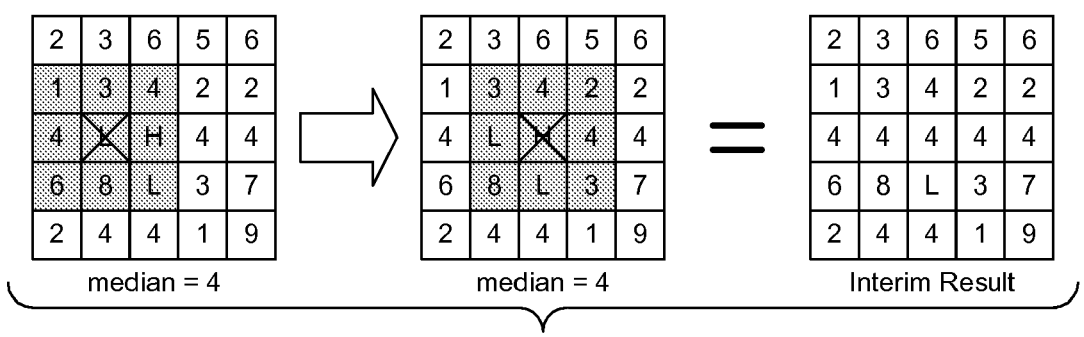
Figure 6D:
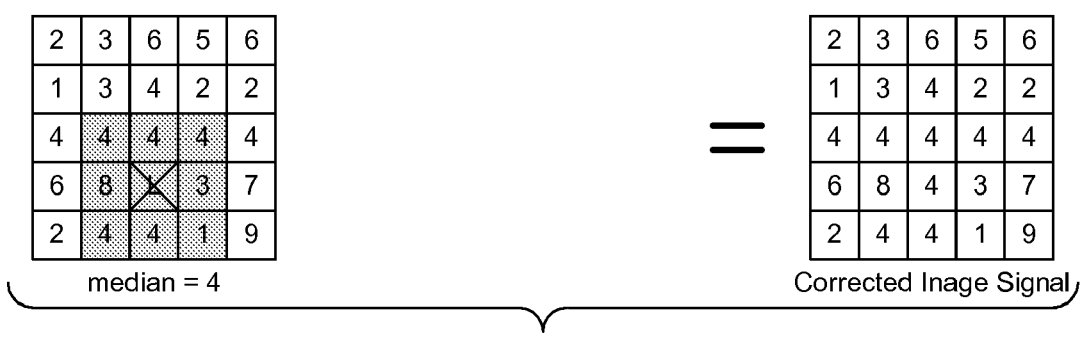

Proceeding to FIG. 6C, defective pixels in a subsequent row are replaced. For purposes of replacing pixels in a row following a row where defective pixels were replaced, the replacement values from the prior row may be used. Continuing in FIG. 6D, the replacement process may continue until all rows with defective pixels have been processed. Thereafter, the image with all defective pixels replaced is the corrected image signal.

Using the corrected image signal, medians for all pixels in the image are generated. The medians are calculated using the replacement values for defective pixels and, for perimeter pixels, the added border as shown in FIGS. 5A and 5B. For example, for the pixel having a value of 8 in the corrected image signal, the three neighboring replacement values of 4 would be used in the median calculation. The ordered pixel values would be 8, 6, 4, 4, 4, 4, 4, 4, and 2. The median for this pixel would be 4.

In one embodiment, during calculation of medians for the entire image, a median value for pixels that were defective is not recalculated and the replacement value is output as part of the median values for those pixels. In another embodiment, a median value for pixels that were defective is recalculated using the replacement value in the ordered pixel values.

As will be appreciated, there are effectively two outputs from block 38. The first output is the corrected image signal, which represents the infrared scene. The corrected image signal is made up from the corrected pixel values as generated in block 36 and, for defective pixels, the replacement values. The corrected image signal may be output to the target tracking and guidance assembly 30 for further processing.

The second output represents a portion of the spatial filtering used for the generation of the correction terms. The second output is the median filter value for each pixel, which may be saved (e.g., buffered) and used as an input to an anti-mean filter applied in block 48 (discussed in the following section).

C(iv). Spatial Filtering

As indicated, two spatial filters may be applied. The first is the 3×3 median filter discussed in the previous section. The second is a 3×3 anti-mean filter applied in block 48 to the median filter value for each pixel. The net effect of the median filter is to remove noise (e.g., outlying pixels) that could bias the anti-mean calculation within the anti-mean filter.

The anti-mean starts by calculating a mean value for each pixel from the median values. The mean is calculated by taking the eight neighbors of the pixel undergoing filtering and averaging the eight median values for those neighbors to generate a mean value. Then, the corrected pixel value (the output from block 36) for the pixel undergoing filtering is subtracted from the mean value to establish an anti-mean value for the pixel. For computational efficiency, eight pixels are used in the averaging calculation instead of nine (the eight neighbors and the pixel undergoing filtering) so that a right shift of three (equates to a divide by eight) may be used in place of a divide by nine. More specifically, the mean is rounded in fixed point math by left shifting the sum of the eight medians by one (multiply by two), adding one to the shifted sum, and then right shifting the result four (divide by 8 samples and divide by 2).

Since the mean filter uses the median values as inputs, there are cases in the image where the mean may not be calculated. This occurs at the perimeter of the image where there is not a complete set of surrounding median values. To address this, anti-medians may be calculated in replace of anti-means for the perimeter of the image.

Figure 7A:
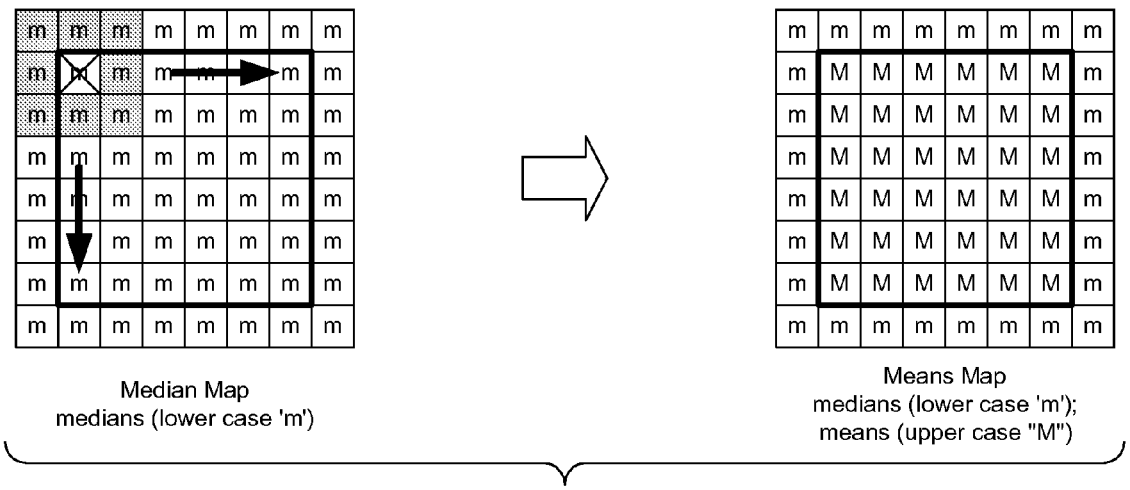
FIGS. 7A and 7B are representations of an exemplary image in various stages of spatial filtering.
Figure 7B:
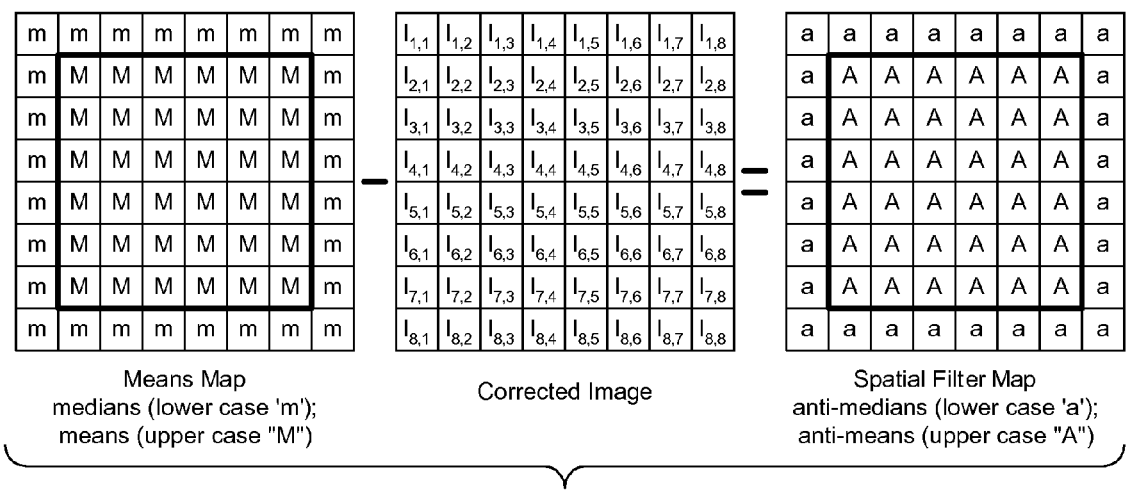

With additional reference to FIGS. 7A and 7B, shown is an exemplary process of spatial filtering with consideration to perimeter values. In the illustration of FIGS. 7A and 7B, spatial filtering is applied to an exemplary 8×8 image. Modifications to apply the spatial filtering to any image size will be apparent to one or ordinary skill in the art.

Starting in FIG. 7A, shown on the left is a map of the medians output by the median filter function of block 38. The median values are shown using a lower case "m". At this stage, the perimeter pixels are ignored so that the median values are passed through to a map of mean values, which is shown on the right of FIG. 7A. Starting in the second column, second row the mean values are calculated. The pixel for which the mean is calculated is shown with cross-marks drawn through the pixel and the eight member elements for the mean calculation are shown with a shaded background. The elements in the mean calculation are averaged and that average value is placed in the mean map as the mean value (shown using an upper case "M") for the corresponding pixel. This process is repeated for all pixels inside the perimeter pixels. A heavy line is used in the figures to graphically separate the perimeter pixels from the pixels upon which means are calculated.

Proceeding to FIG. 7B, the corrected image value for each pixel as output by block 36 is subtracted from the corresponding value in the mean map. For the perimeter pixels, an anti-median (shown using a lower case "a") is calculated by subtracting the corrected image value from the corresponding median value. For the remaining pixels, an anti-mean (shown using an upper case "A") is calculated by subtracting the corrected image from the corresponding mean value. The output is a spatial filter map.

C(v). Spatial Filter Comparison

In block 50, a spatial filter comparison is made. Compared is the output of the anti-means filter from block 48 for the current image frame and the output of the anti-means filter for the preceding image frame. Anti-means values output from block 48 may be stored in block 52 for use in the comparison.

In order to differentiate between scene input and fixed pattern noise, the scene registration incident on the focal plane array 16 should be different for any two consecutive image frames. As indicated, gimbal motion of the sensor 12 may be used to achieve differences in scene registration from frame to frame.

The premise of comparing spatial filter output for the current and preceding image frames on a pixel by pixel basis is that if the filter output for a given pixel in consecutive images has correlation (e.g., "looks the same"), there is fixed pattern noise present. It may be noted that the filter output is effectively a comparison of each pixel with a combination of its neighbors. If fixed pattern noise is present, correction terms for the pixel may be updated. If the filter output for the current image and previous image do not match, it may be assumed that scene based input is driving the differences and the correction terms may not be updated.

The rules for comparing the output of the spatial filters for a pixel may be summarized as follows. The two filter outputs are compared to determine the image with the smaller magnitude. Then, the magnitude of the difference between the two filter outputs for the pixel are compared against a threshold. If the difference is less than or equal to the threshold, a correction term associated with the pixel will be modified. Otherwise, the correction term will not be modified.

More elaborated comparison rules may be specified as follows. Each anti-mean value (row/column) of the previous image frame is compared to the corresponding anti-mean value of the current frame under two tests. The first test determines if the absolute value of the previous anti-mean value is less than the absolute value of the current anti-mean value. If the first test passes, an error value is set to the anti-mean of the previous frame. If the first fails, the error value is set to the anti-mean of the current frame. Thus, smaller anti-mean value in terms of absolute value is retained.

The second test determines if the absolute value of the difference between the current anti-mean and the previous anti-mean is less than or equal to a comparison threshold. If the second test passes, the pixel is tagged to have the corresponding offset correction value modified (e.g., in the pixel map tags of Table 1, tag value 1 may be set to yes to indicate that the offset correction value for the pixel is to be modified). If the second test fails, the pixel is tagged not to have the corresponding offset correction value modified (e.g., in the pixel map tags of Table 1, tag value 1 may be set to no to indicate that no changes to the offset correction value for the pixel should be made). The second test is used as a way to determine if the change from frame to frame is inconsistent with expected characteristics of the fixed pattern noise. In particular, if the difference between the current spatial filter map and the previous spatial filter map for a pixel is too big, the change from frame to frame may be considered too big to be reliable.

C(vi). Update Correction Terms

In block 54, updating to adaptive non-uniform compensation offset correction terms may be accomplished by using the error values output from the spatial filter comparison (block 50) and updating the correction term by a fraction of the error value. The update amount (fractional amount of the error value) is controlled by a transfer function. The transfer function has four thresholds based upon the magnitude of the error value (absolute value of the error value). Table 2 shows the transfer function by setting forth comparisons of the error value with the threshold values against expressions for generating the corresponding correction term output values. The absolute value of the error value is expressed in Table 2 as |Error|.

TABLE 2

| Transfer Function | Correction Term Output Value |
| --- | --- |
| |Error| ≦ Threshold 1 | 0 (dead band) |
| Threshold 1 < |Error| ≦ Threshold 2 | Error ÷ 16 |
| Threshold 2 < |Error| ≦ Threshold 3 | Error ÷ 8 |
| Threshold 3 < |Error| ≦ Threshold 4 | Error ÷ 4 |
| Threshold 4 < |Error| | Error ÷ 2 |

The four thresholds in the transfer function may be thought of as providing the main control of the aggressiveness of the adaptive non-uniform compensation. For example, if all of the thresholds are set to zero, then the magnitude of the error will be greater than threshold number 4 so the adjustment to the correction term is half of the error value. This results in a relatively high rate of fixed pattern noise convergence, but can lead to an increase in temporal noise and/or possible after-image burn-in of the input scene.

Additional details as to how the error value is used to update the corresponding correction term follow. The transfer function thresholds are compared to the absolute value of the error value. The error value is then left-shifted or right-shifted in an appropriate manner to scale the error value by a half, a quarter, an eighth or a sixteenth. Since the terms are already scaled-up compared to the video (e.g., they have eight times the precision as the video), the error value is shifted to the left by 2 in order to provide the half correction, left shifted by 1 for the quarter correction, not changed for the eighth correction or right shifted by 1 for the sixteenth correction. The resulting bit signed values may be referred to as modified error values.

Term decay is then used as a way to reduce the incidence of scene burn-in. The term decay process simply adds one or subtracts one from each correction value (which may be referred to as a "term") such that the terms are closer to zero. If a particular term was generated due to mistaking a scene input as fixed pattern noise, then the term decay will assist in reducing or removing this term over time. The terms are decayed before they are updated by the modified errors.

If the previous offset correction term is positive, then the modified error value is summed with the term decay negative value (usually negative 1) to generate a revised modified error value. If the previous offset correction term is negative, then the modified error is summed with the term decay positive value (usually +1) to generate a revised modified error value. For normal operations, a revised modified error value of zero corresponds to no modification of the corresponding offset correction term. The revised modified error values are then clipped to 16-bits signed.

In block 56, updated offset correction terms are stored. For any given pixel, the previously stored offset correction term is updated by storing the clipped revised modified error value as part of the set of correction terms if each of two conditions are satisfied. If either of the conditions are not satisfied for the pixel, no change to the currently stored offset correction term for the corresponding pixel is made. The first condition is that no override has been applied to freeze the update process, such as reaching the conclusion of an initiation period as described below. The second condition is that the pixel has been tagged to be updated during operation of the spatial comparison function described above. Once stored, the updated offset correction values may be applied to the next frame of image data in block 36.

C(vii). Detection of Defective Pixels

The purpose of defective pixel detection is to identify and replace pixels having a questionable output. For the description herein there are three categories of defective pixels, including factory dead pixels, blinkers and drifters.

Blinkers are pixels that suddenly change their output level. This phenomenon has been observed but the mechanism is not understood. Nevertheless, blinkers have very large anti-mean values and may be incapable of producing valid pixel values. A blinker pixel may corrupt the spatial filtering of its immediate neighbors. To minimize the corruption, the pixel may be tagged as defective. Tagging blinkers as defective will cause the pixel to be replaced in block 38, before spatial filtering. The pixel will remain tagged as defective until the pixel map is re-initialized.

Blinkers may be identified in block 58. For instance, any anti-mean value that is larger than the anti-mean values of its neighbors by a predetermined amount may be considered a blinker and tagged as such in the pixel map.

Drifters are pixels that slowly change their transfer characteristics. Detection of drifters may be detected in block 60. Drift may be quantified based on the magnitude of the offset correction term for the pixel. For instance, if the offset correction term has an absolute value that exceeds a predetermined value, the corresponding pixel may be a drifter. Drifters may have corrected pixel values beyond expected norms and will be tagged as defective in the pixel map. Tagging drifters as defective will cause the pixel to be replaced in block 38, before spatial filtering. The pixel will remain tagged as defective until the pixel map is re-initialized.

C(viii). Initialization Sequence

In one embodiment, an initialization sequence is used to attempt to correct any blinkers. The initialization sequence may include setting all thresholds except for blinker detection until a predetermined number of frames (e.g., 20 frames) have been processed. During these frames, blinker detection thresholds may remain at a maximum value to effectively turn off blinker detection. Thus, blinkers will be corrected using an offset term for these initial frames. After the initial frames have been processed, the blinker detection threshold value may be set to a normal operating value. At that point, any anti-mean that is greater than the threshold will be identified and the corresponding pixel will be tagged as a blinker, thereby driving the defective pixel replacement logic to replace that pixel in subsequent frames.

C(ix). Finalization of Correction Terms

In one embodiment, updating of the offset correction terms may be made without interruption during all imaging made with the sensor 12. In a preferred embodiment, however, the correction terms are generated and recursively updated during an initiation period at the beginning of an imaging process, after which imaging is carried out and corrections are applied using the set of correction terms stored at the end of the initiation period. The initiation period may last for a predetermined amount of time, a predetermined number of frames or until a metric relating to fixed pattern noise convergence is reached. After the initiation period, freezing the gimbal motion of the sensor 12 to change the perception of the scene from frame to frame may be terminated to generate a more stable image signal.

D. Conclusion

The techniques described above to correct the output of a focal plane array 16 may significantly reduce the amount of fixed pattern noise in an image signal corresponding to a detected scene while minimizing the introduction of artifacts. The techniques use a localized series of filters to determine if each pixel is over-responding or under-responding compare to the neighboring pixels. Also, two consecutive images are used at a time to differentiate fixed pattern noise from scene input. While the techniques work best when the perception of the scene is different from one image frame to the next during generation of offset correction values, the need to create a "bland" input for offset correction values is eliminated. Furthermore, values for defective pixels may be replaced with an acceptable approximation value for the output of the pixel had that pixel been operational.

Conventional techniques to generate a set of correction terms may take thousands of frames of data to generate the correction terms. The techniques described herein may reduce the number of frames used to generate the correction terms by one or two orders of magnitude. For example, the techniques described herein may use about sixty or fewer frames of data to generate a complete set of correction terms.

Depending on the frame rate, this would allow the correction terms to be generated in less than one second.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of reducing an amount of fixed pattern noise from an image signal generated by an image sensor, comprising:

for each operational pixel in the image signal, applying a recursively updated offset term to generate a corrected image signal; and recursively updating the offset correction terms by:

spatially filtering the corrected image signal for a current frame of the corrected image signal by applying a median filter to each pixel of the current frame and applying an anti-means filter to the output of the median filter to generate a filtered corrected frame of the corrected image signal;

comparing the filtered corrected current frame of the corrected image signal with a spatially filtered corrected preceding frame of the corrected image signal, the spatially filtered corrected preceding frame being generated by applying the median filter to each operational pixel of the preceding frame of the corrected image signal and applying the anti-means filter to the output of the median filter for the corrected image signal of the preceding frame;

wherein the preceding frame and the current frame are sequential image frames of the corrected image signal that have different scene registration by movement of the image sensor;

updating the offset correction terms with terms generated as a function of the comparison; and wherein the median filter removes noise in the form of pixels with outlying values that could bias operation of the anti-means filter.

2. The method of claim 1, wherein the median filter has an arrangement of pixel elements centered on a pixel to be filtered, the median filter selects the value of the middle pixel element in terms of magnitude as an output of the median filter for the pixel to be filtered.

3. The method of claim 2, wherein a value for a defective pixel in the pixel elements of the filter is replaced with a replacement value prior to selection of the output of the median filter.

4. The method of claim 3, wherein the replacement value is one of a maximum possible pixel value or a minimum possible pixel value.

5. The method of claim 1, wherein the anti-means filter has an arrangement of pixel elements centered on a pixel to be filtered, the anti-means filter averages values of the pixel elements to generate an output of the spatial filtering.

6. The method of claim 5, wherein the anti-means filter averages pixels neighboring the pixel to be filtered to generate the output of the spatial filtering.

7. The method of claim 1, wherein the movement of the image sensor results in the current frame and the preceding frame have different perspectives of a scene imaged by the image sensor to achieve the different scene registration.

8. The method of claim 1, further comprising identifying defective pixels in the corrected image signal and replacing a value for each defective pixel.

9. The method of claim 8, wherein the replacement value for each defective pixel is generated by applying a median filter to the defective pixel.

10. The method of claim 9, wherein the median filter has an arrangement of pixel elements centered on the defective pixel, the median filter selects the value of the middle pixel element in terms of magnitude as the replacement value for the defective pixel.

11. The method of claim 10, wherein during median filtering a value for each defective pixel in the pixel elements of the filter is replaced with a replacement value selected from a maximum possible pixel value or a minimum possible pixel value.

12. The method of claim 9, wherein the defective pixels are selected from factory dead pixels, drifters, blinkers, and combinations thereof.

13. The method of claim 1, wherein generation of the offset correction terms as a function of the comparison includes:

generating an error value for each pixel, the error value being the smaller of the relative magnitudes of the spatially filtered pixel value for the current frame and the spatially filtered pixel value for the preceding frame;

modifying the error value by generating a fraction of the error value, the fractional size based on the magnitude of the error value; and applying a term decay to the modified error values.

14. The method of claim 1, further comprising freezing the recursive updating of the offset correction terms an end of an initiation period and correcting the image signal with the frozen correction terms after the initiation period.

15. The method of claim 1, wherein the offset correction term is not updated for a pixel if a difference between the current spatial filter value for the pixel and the preceding filter spatial filter value for the pixel is greater than a predetermined threshold.

16. The method of claim 1, further comprising outputting the corrected image signal to a target tracking system of a missile.

17. An imaging system comprising:

a focal plane array that generates an image signal; and a video processing assembly that reduces an amount of fixed pattern noise from the image signal by applying a recursively updated offset term to each operational pixel in the image signal to generate a corrected image signal, wherein the video processing assembly is configured to:

spatially filter the corrected image signal for a current frame of the corrected image signal by applying a median filter to each pixel of the current frame and applying an anti-means filter to the output of the median filter to generate a filtered corrected frame of the corrected image signal;

compare the filtered corrected current frame of the corrected image signal with a spatially filtered corrected preceding frame of the corrected image signal, the spatially filtered corrected preceding frame being generated by applying the median filter to each operational pixel of the preceding frame of the corrected image signal and applying the anti-means filter to the output of the median filter for the corrected image signal of the preceding frame;

wherein the preceding frame and the current frame are sequential image frames of the corrected image signal that have different scene registration by movement of the image sensor; and recursively update the offset correction terms with terms generated as a function of the comparison;

wherein the median filter removes noise in the form of outlying pixels that could bias operation of the anti-means filter.

18. The imaging system of claim 17, further comprising a gimbal to move the focal plane array so that the current frame and the preceding frame have different perspectives of a scene imaged by the focal plane array during updating of the offset correction terms to achieve the different scene registration.

19. The imaging system of claim 17, wherein the video processing assembly identifies defective pixels in the corrected image signal and replaces a value for each defective pixel.

20. The method of claim 1, wherein the image sensor is mounted to a gimbal that effectuates the movement of the image sensor.

21. The method of claim 8, wherein the replacement value for each defective pixel is generated by replacing dead pixels with a corresponding value from a checkerboard map of high values and low values across the frame, and making a median calculation of pixel values from the defective pixel and neighboring pixels to determine the replacement value.

22. The method of claim 14, wherein the frozen correction terms are generated using sixty or fewer frames.

23. The method of claims 1, wherein the anti-means filter applied to the output of the median filter to generate a corrected current frame of the image signal is changed to an anti-median filter for spatial filtering of perimeter pixels.

* * * * *